United States Patent
Shiu et al.

(10) Patent No.: US 8,461,769 B2
(45) Date of Patent: Jun. 11, 2013

(54) LED DRIVING CIRCUIT, LED DRIVING CONTROL UNIT AND TRANSISTOR SWITCH MODULE THEREOF

(75) Inventors: Shian-Sung Shiu, Yonghe (TW); Chung-Che Yu, Yonghe (TW); JuanJuan Liu, Wuxi (CN)

(73) Assignee: Green Solution Technology Co., Ltd., Xizhi, Taipei County (TW)

( * ) Notice: Subject to any disclaimer, the term of this patent is extended or adjusted under 35 U.S.C. 154(b) by 815 days.

(21) Appl. No.: 12/494,832

(22) Filed: Jun. 30, 2009

(65) Prior Publication Data

US 2009/0322235 A1 Dec. 31, 2009

(30) Foreign Application Priority Data

Jun. 30, 2008 (TW) ................................ 97124585 A

(51) Int. Cl.
*H05B 39/04* (2006.01)
(52) U.S. Cl.
USPC .................. 315/291; 315/185 S; 315/312
(58) Field of Classification Search
USPC ...... 315/247, 246, 224, 185 S, 291, 297–311, 315/312–326; 345/102, 204, 211–214, 82, 345/83
See application file for complete search history.

(56) References Cited

U.S. PATENT DOCUMENTS

| 7,999,484 B2 * | 8/2011 | Jurngwirth et al. | 315/247 |
| 8,035,311 B2 * | 10/2011 | Prexl et al. | 315/291 |
| 2010/0072898 A1 * | 3/2010 | Ohashi et al. | 315/127 |

FOREIGN PATENT DOCUMENTS

| JP | 2-239398 | 9/1990 |
| JP | 2009-520031 | 5/2009 |
| WO | WO2007/071033 A1 | 6/2007 |
| WO | WO 2007071033 A1 * | 6/2007 |

* cited by examiner

*Primary Examiner* — James H Cho
(74) *Attorney, Agent, or Firm* — Muncy, Geissler, Olds & Lowe, PLLC

(57) ABSTRACT

An LED driving circuit is used for dimming by switching between an operating current and a maintaining current or by voltage clamping of a source/drain of MOSFET that is coupled to the LED module. When the LED module is dimmed off, the voltage across the LED module can be kept at a value around a lighting threshold voltage of the LED module that is a minimum voltage for lighting the LED module. Therefore, a voltage difference between the drain and the source of MOSFET coupled to the LED module is smaller than that in the conventional arts. Hence, a withstand voltage of MOSFET can be reduced, and cost of the LED driving circuit as well as the power consumption of MOSFET can be lessened, thereby improving integral efficiency of the circuit.

12 Claims, 7 Drawing Sheets

LED DRIVING CIRCUIT, LED DRIVING CONTROL UNIT AND TRANSISTOR SWITCH MODULE THEREOF

BACKGROUND OF THE INVENTION

1. Field of the Invention

The present invention relates to a Light-Emitting Diode (LED) driving circuit and LED driving control unit thereof; in particular, the present invention relates to an LED driving circuit and LED driving control unit for maintaining small amount of current and clamping voltage of the LED driving circuit.

2. Description of Related Art

Refer first to FIG. 1, wherein a conventional Light-Emitting Diode (LED) driving device is shown. The illustrated LED driving device comprises a dimming control unit 10, an error amplifier 15, an N-type Metal Oxide Semiconductor Field Effect Transistor (MOSFET) 20, a power supply 25, an LED module 30, and a current detection resistor R. The power supply 25 is coupled to one end of the LED module 30 so as to provide a driving voltage enabling the LED module 30 lighting. The N-type MOSFET 20 is coupled to the other end of the LED module 30, which controls the magnitude of current flowing through the LED module 30 based on a switch control signal. The current detection resistor R is coupled to the N-type MOSFET 20, which detects the magnitude of current flowing through the LED module 30 and generates a current detection signal. The error amplifier 15 receives the current detection signal and a control signal from the dimming control unit 10, thereby accordingly outputting the switch control signal to the N-type MOSFET 20 for controlling the magnitude of current passing through the N-type MOSFET 20. The dimming control unit 10 receives a dimming signal, and, when such a dimming signal represents an ON state, generates a reference level signal as a control signal such that the current detection signal and the reference level signal are equal in terms of electric potential, allowing the N-type MOSFET 20 to be in a conductive state; on the other hand, if such a dimming signal represents an OFF state, the dimming control unit 10 generates a signal of low level as the control signal, causing the N-type MOSFET 20 to enter into a cut-off state, thereby achieving the desired dimming effect.

Upon occurrence of the N-type MOSFET 20 being cut-off, current no long flows through the LED module 30, and at this moment, the electric potential at the drain of the N-type MOSFET 20 is pulled up and approximately equal to the driving voltage provided by the power supply 25. Taking 4 Volts of LED driving voltage for example, in case that the LED module 30 is composed of 20 LEDs connected in series, the driving voltage is 80 Volts and the N-type MOSFET 20 needs to be the high voltage MOSFET. The high voltage MOSFET can withstand high voltage, whereas occupies comparatively larger chip area, resulting in more production cost and significantly increases the gate-source capacitance (Cgs) as well. The increase in Cgs also leads to a fact that the error amplifier 15 is required to have higher driving capability in order to drive the N-type MOSFET 20. Furthermore, the power consumption of MOSFET is proportional to $fCV^2$, where f indicates switching frequency, C indicates gate-source capacitance and V indicates electric potential change in switching operations. Consequently, the MOSFET having better high voltage withstanding capability consumes more power, and additional circuits are needed for heat sinking so as to prevent possible over-temperature or damage problems in the circuit and MOSFET.

SUMMARY OF THE INVENTION

In view of the aforementioned issues, as the dimming representing the OFF state, the present invention maintains the current of the LED module at a very small magnitude, or clamps the voltage difference between the drain and source of the transistor coupled to the LED module within a preset value; accordingly, the cross voltage over the LED module can be kept approximately at a lighting threshold voltage, such that the voltage between the drain and source of the transistor coupled to the LED module will not become excessively large. Therefore, the LED driving circuit and LED driving control unit thereof according to the present invention allows to reduce the requirement on the withstand voltage of MOSFET, and the cost of the LED driving circuit can be significantly lessened, further decreasing power consumption of the MOSFET and improving integral efficiency of the circuit.

To achieve the aforementioned objectives, the present invention discloses a Light-Emitting Diode (LED) driving circuit, comprising an LED module and a current control component, wherein the LED module comprises at least one connecting end. The current control component has a control end and at least one driving end, in which the at least one driving end is correspondingly coupled to the at least one connecting end of the LED module, and the control end receives a control signal so as to control the current flowing through the LED module to be of a first current value or a second current value, wherein the first current value is greater than the second current value.

The present invention also discloses a Light-Emitting Diode (LED) driving circuit, comprising an LED module, a current control device, a voltage clamping component and a dimming control unit. The LED module comprises a plurality of LEDs connected in series, and one end of the LED module is connected to a direct current (DC) driving voltage. The current control device has a control end, a first end and a second end, in which the first end is coupled to the other end of the LED module, the second end is coupled to ground, and the control end receives a control signal for controlling the current flowing through the LED module. The voltage clamping component is coupled to the first end of the current control device for clamping the electric potential at the first end. The dimming control unit generates the control signal in accordance with a dimming signal. Herein, as the dimming signal representing a cut-off state, the voltage clamping component clamps the electric potential at the first end as being lower than or equal to a preset electric potential.

In the control unit, the present invention further discloses a Light-Emitting Diode (LED) driving control unit, comprising a current switch unit and a current control component. The current switch unit generates at least one switch signal based on a control signal. The current control component has at lease one driving end and a control end, in which the at lease one driving end is correspondingly coupled to at least one connecting end of an LED module, and the control end receives the at least one switch signal for controlling the current of the LED module to be of a first current value or a second current value.

The present invention also discloses a Light-Emitting Diode (LED) driving control unit, comprising a current control component and a voltage clamping component. The current control component comprises a control end, a reference end and at least one driving end, in which the at least one driving end is correspondingly coupled to at least one connecting end of an LED module, the control end receives a control signal for controlling the current control component to be in a conductive state or in a cut-off state, and the reference end is coupled to a reference level. The voltage clamping component is coupled to the at least one driving end of the current control component such that the electric potential difference between the reference end and the at least one driving end is lower than or equal to a preset value.

The present invention further discloses a transistor switch module, comprising a transistor switch, a controller and a voltage clamping component. The transistor switch has a control end, a first end and a second end, in which the first end is coupled to an LED module, and the control end receives a control signal for controlling the magnitude of current flowing through the transistor switch. The voltage clamping component is coupled to the first end of the transistor switch, such that, as the magnitude of the current being zero, the voltage clamping component clamps the electric potential at the first end of the transistor switch to be lower than or equal to a preset electric potential.

The summary illustrated as above and the detailed descriptions set forth hereunder are exemplary and aim to further explain the claimed scope of the present invention. Other purposes and advantages of the present invention will be explained as well in the following descriptions and drawings.

DETAILED DESCRIPTION OF THE PREFERRED EMBODIMENTS

In order to prevent occurrence of excessive cross voltage of the transistor controlling the current flowing through a LED module during a dimming process of the LED module, the present invention switches the current flowing through the LED module between an operating current value and a maintaining current value, wherein the maintaining current value is much smaller than the operating current value; e.g., the ratio of the operating current value against the maintaining current value being greater than 100. Alternatively, the present invention may use a voltage clamping component to, as the MOSFET coupled to the LED module being in a cut-off state, clamp the electric potential at the drain of the MOSFET so as to reduce requirement on the withstand voltage of the MOSFET. In this way, the precision of dimming operations can be sustained, and problems of expensive fabrication cost and high power consumption caused by use of high withstand voltage transistors can be effectively resolved.

Figure 1:
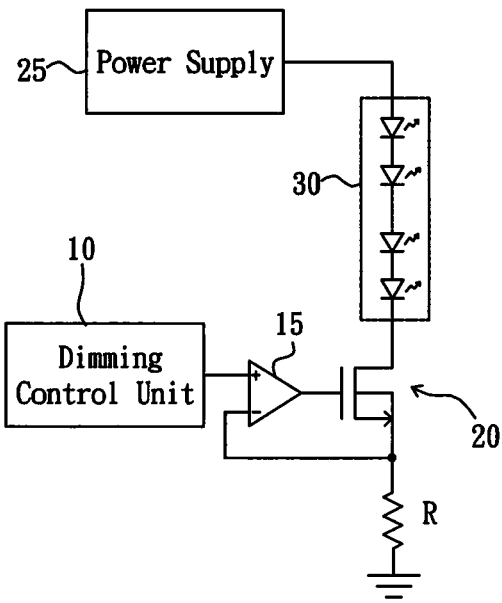
FIG. 1 is a conventional Light-Emitting Diode (LED) driving device.
Figure 2:
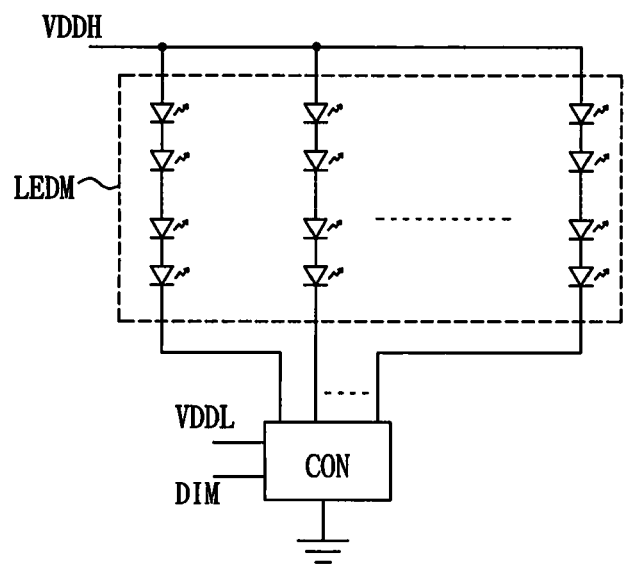
FIG. 2 is a block diagram for the circuit in the LED driving circuit according to the present invention.

Refer to FIG. 2, wherein a block diagram for the circuit in the LED driving circuit according to the present invention is shown. The LED driving control unit comprises an LED module LEDM and a current control component CON. One side of the LED module LEDM is connected to a driving voltage VDDH and the other side thereof has at least one connecting end, in which the number of the connecting ends is determined based on the number of LED strings in the LED module LEDM. The current control component CON may be a control chip or comprise certain electronic components, which has a control end and at least one driving end coupled to the corresponding connecting end of the LED module LEDM. The current control component CON supplies the LED module LEDM with current via a driving end, thereby enabling the LED module LEDM lighting. The current control component CON is coupled to a power source voltage VDDL and has a ground end grounded, and such the power source voltage VDDL provides the current control component CON with the required power for operations. The control end of the current control component CON receives a control signal DIM, and, as the control signal DIM representing a conductive state, controls the current flowing through the LED module LEDM to be of a first current value. On the other hand, while the control signal DIM representing a cut-off state, the current control component CON controls the current flowing through the LED module LEDM to be of a second current value, where the first current value is greater than the second current value and the control signal DIM can be a dimming signal. Alternatively, when the control signal DIM represents a conductive state, the current control component CON controls the current flowing through the LED module LEDM to be of a first current value, and when the control signal DIM represents a cut-off state, it clamps the voltage value at the driving end to be lower than or equal to a preset electric potential. No matter the current of the LED module LEDM is of the first current value or second current value, cross voltage over the LED module LEDM is definitely higher than the lighting threshold voltage of the LED module LEDM. That is, the voltage taken by the current control component CON is necessarily smaller than (Driving Voltage VDDH-Lighting Threshold Voltage). Similarly, the above-said advantage can be also achieved by clamping the voltage value at the driving end. Hence, compared with prior art, the requirement on withstand voltage of the current control component CON can be less.

In applying the present invention to dimming processes, it is possible to specify the ratio of the first current value against the second current value to create significant luminance variation in the LED module LEDM, thereby achieving the required dimming effect. Said ratio of current values is determined based on a preset minimum of a dimming range (i.e. a preset ratio), such as the dimming range is 1%~100%, then the ratio of current values needs to be 100 or more.

Several embodiments will be set forth in details hereunder for describing the technologies in connection with the present invention as examples, rather than being used to limit the scope thereof; those skilled ones in the art can conveniently apply the concept of the disclosed circuits to the driving of LED module having multiple strings based on such embodiments.

Figure 3:
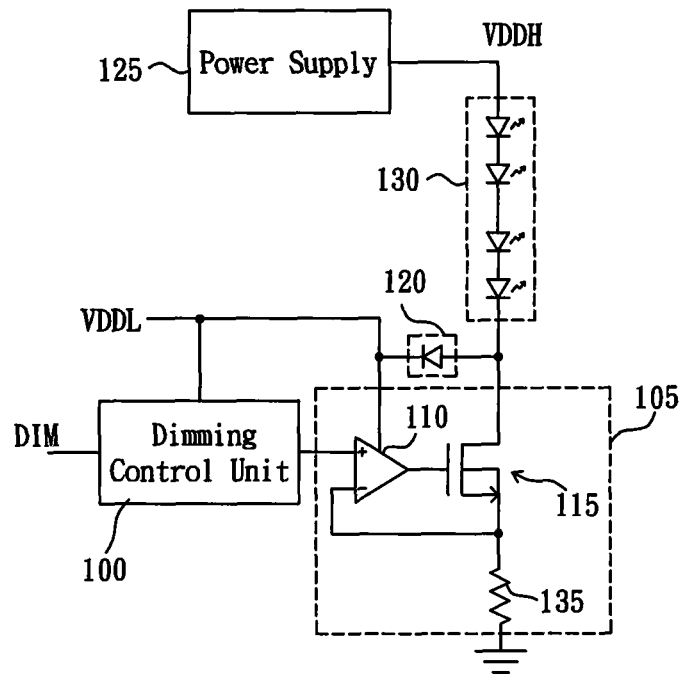
FIG. 3 is a circuit diagram for a transistor switch module of a first preferred embodiment according to the present invention, which is applicable in an LED driving device.

Refer now to FIG. 3, wherein a circuit diagram for a transistor switch module of a first preferred embodiment according to the present invention, which is applicable in an LED driving device, is shown. The illustrated LED driving device comprises a dimming control unit 100, a current control device 105, a voltage clamping component 120, a power supply 125 and an LED module 130. The power supply 125 is coupled to one end of the LED module 130 to provide a driving voltage VDDH for driving the LED module 130 to light. The current control device 105 has a control end, a first end and a second end. The first end is coupled to the LED module 130, the second end is coupled to a reference level (e.g. ground), and the control end receives a control signal generated by the dimming control unit 100. The current control device 105 comprises a current control unit 110, a MOSFET 115 and a current detection resistor 135. A first source/drain of the MOSFET 115 is coupled to the first end, and a second source/drain thereof is coupled to the second end. The current control unit 110 is coupled to a gate of the MOSFET 115, and outputs a gate control signal for controlling the state of the MOSFET 115 in accordance with a detecting signal generated by the current detection resistor 135 and the control signal generated by the dimming control unit 100. The current control unit 110 can be an error amplifier. The dimming control unit 100 generates a control signal based on a control signal DIM so as to control the current flowing through the LED module 130 via the current control device 105, and when the dimming signal represents a conductive state (e.g. high level), the current control device 105 conducts the current of a preset magnitude, thereby enabling the LED module 130 lighting. Contrarily, while the dimming signal represents a cut-off state (e.g. low level), the current control device 105 stops conducting current, i.e. no lighting in the LED module 130. The voltage clamping component 120 is coupled to the first end of the current control device 105 and a reference level, and when the dimming signal represents a cut-off state, the voltage clamping component 120 clamps the electric potential at the first end to a preset electric potential, thus ensuring the difference between the electric potential at the first end and the electric potential at the second end of the current control device 105 being less than a preset value. The reference level can be the electric potential of ground or other stable voltage source in the system; in the present embodiment, the reference level is a power source voltage VDDL of the dimming control unit 100 and the voltage clamping component 120 is a diode.

The preset level clamped by the voltage clamping component 120 is set based on the lighting threshold voltage of the LED module 130, preferably set to approximately (Driving Voltage VDDH-Lighting Threshold Voltage). For example, the driving voltage VDDH is 80 Volts, and the LED module 130 comprises 20 LEDs connected in series, the average threshold voltage of LED is 3.5V, therefore the lighting threshold voltage in the LED module 130 is 20*3.5=70 (Volts). Accordingly, the preset clamp level can be set to about 80−70=10 (Volts), preferably slightly higher than 10 Volts, for ensuring no lighting in the LED module 130. As a result, when the dimming signal DIM represents a conductive state, the voltage at the first end of the current control device 105 is lower than the preset level of 10 Volts, so the LED module 130 lights, and no action occurs in the voltage clamping component 120. When the dimming signal DIM represents a cut-off state, the current control device 105 stops conducting current, thereby no lighting in the LED module 130. At this moment, the voltage at the first end is clamped by the voltage clamping component 120 to the preset level, nearby 10 Volts. In this way, the required withstand voltage of the MOSFET 115 can be only higher than 10 Volts, but not the requirement of 80 Volts in prior art.

Therefore, the LED driving device according to the present invention only needs to use general low-voltage MOSFETs, rather than high-voltage MOSFETs, thus facilitating reduced fabrication cost. Besides, the low-voltage MOSFET is not only less demanding on the driving capability of the dimming control unit, power consumption thereof is also lowered, thereby enhancing circuit efficiency of the LED driving device.

Figure 4:
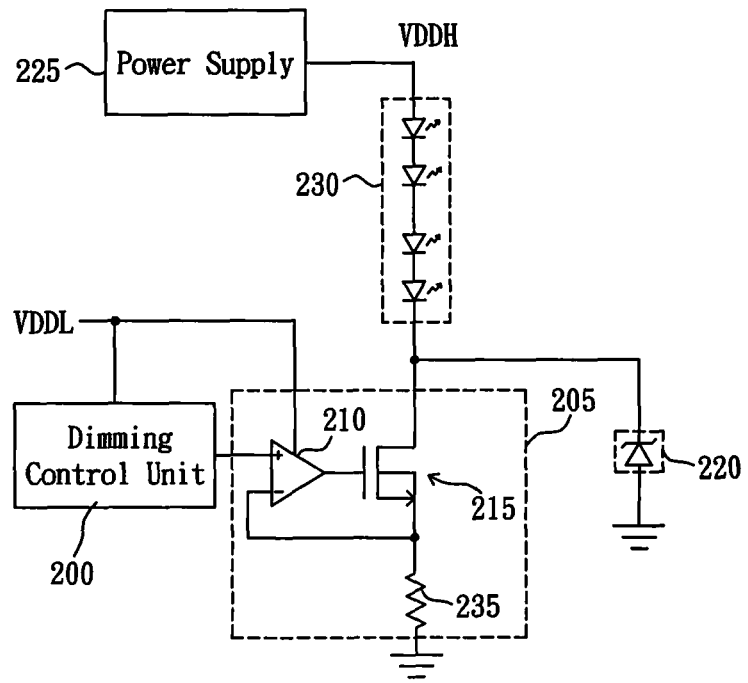
FIG. 4 is a circuit diagram for a transistor switch module of a second preferred embodiment according to the present invention, which is applicable in an LED driving device.

In addition to the diode illustrated as FIG. 3, the voltage clamping component 120 can be other components capable of voltage clamping as well. Refer to FIG. 4, wherein a circuit diagram for a transistor switch module of a second preferred embodiment according to the present invention, which is applicable in an LED driving device, is shown. The depicted LED driving device comprises a dimming control unit 200, a current control device 205, a voltage clamping component 220, a power supply 225 and an LED module 230. Herein the current control device 205 comprises a current control unit 210, a MOSFET 215 and a current detection resistor 235. Compared with the circuit shown in FIG. 2, the voltage clamping component 120 illustrated in FIG. 2 is a diode, while the voltage clamping component 220 shown in FIG. 3 is a Zener diode. The clamping component 220 is coupled between the first end of the current control device 205 and a reference electric potential (ground), thus enabling clamping of the voltage at the first end of the current control device 205 to or under a preset level based on the dimming signal.

Figure 5:
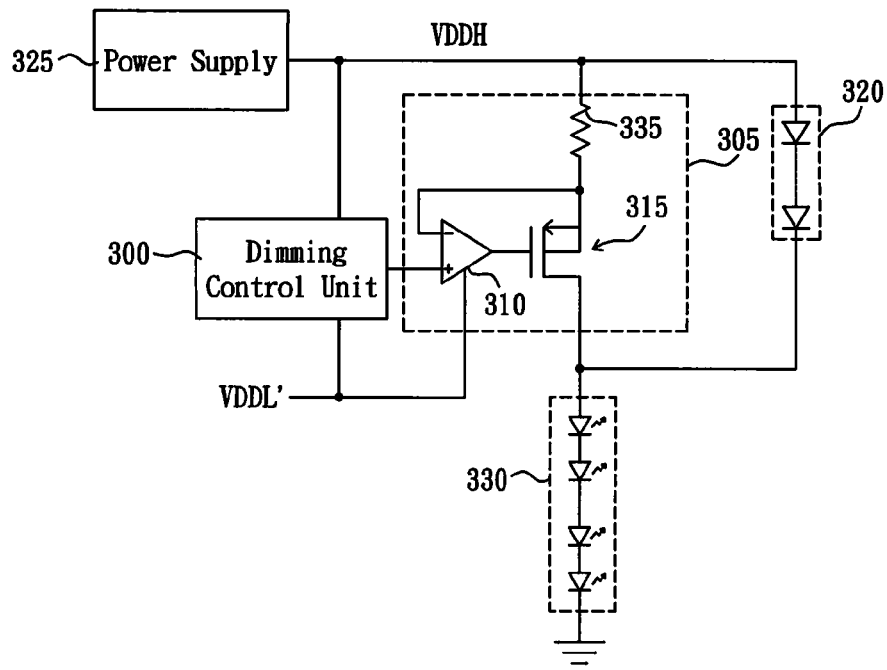
FIG. 5 is a circuit diagram for a transistor switch module of a third preferred embodiment according to the present invention, which is applicable in an LED driving device.

Although both the above-said two embodiments the N-type MOSFET is used as example, in practice it is also possible to use the P-type MOSFET. Alternatively, multiple N-type MOSFETs or P-type MOSFETs can be used as the transistor switch in some cases (e.g. applications for high current operations). Refer to FIG. 5, a circuit diagram for a transistor switch module of a third preferred embodiment according to the present invention, which is applicable in an LED driving device, is shown. In the present embodiment, the current control device 305 is coupled to a reference electric potential (the driving voltage VDDH outputted by the power supply 325) and a power source voltage VDDL'. The current control device 305 comprises a current control unit 310, MOSFET 315 and current detection resistor 335, in which the MOSFET 315 is a P-type MOSFET. The first end of the current control device 305 is coupled to the LED module 330, the second end thereof is coupled to a reference electric potential (in the present embodiment, the driving voltage VDDH outputted by the power supply 325). One end of the LED module 330 is coupled to the first end of the current control device 305, while the other end thereof is connected to ground. The dimming control unit 300 generates a control signal based on a dimming signal, and controls the MOSFET 315 entering into the cut-off state or conductive state through the current control unit 310 in the current control device 305, thereby achieving the effect of dimming. The voltage clamping component 320 comprises at least one diode, and can adjusts the preset clamp level of the voltage clamping component 320 by manipulating the number of diodes therein (i.e., the preset clamp level≈N*Vd, where N indicates the number of diodes, Vd indicates the forward biase voltage of the at least one diode), such that the electric potential difference between both ends of the MOSFET 315 can be less than a preset value, even it is in a cut-off state.

Figure 6:
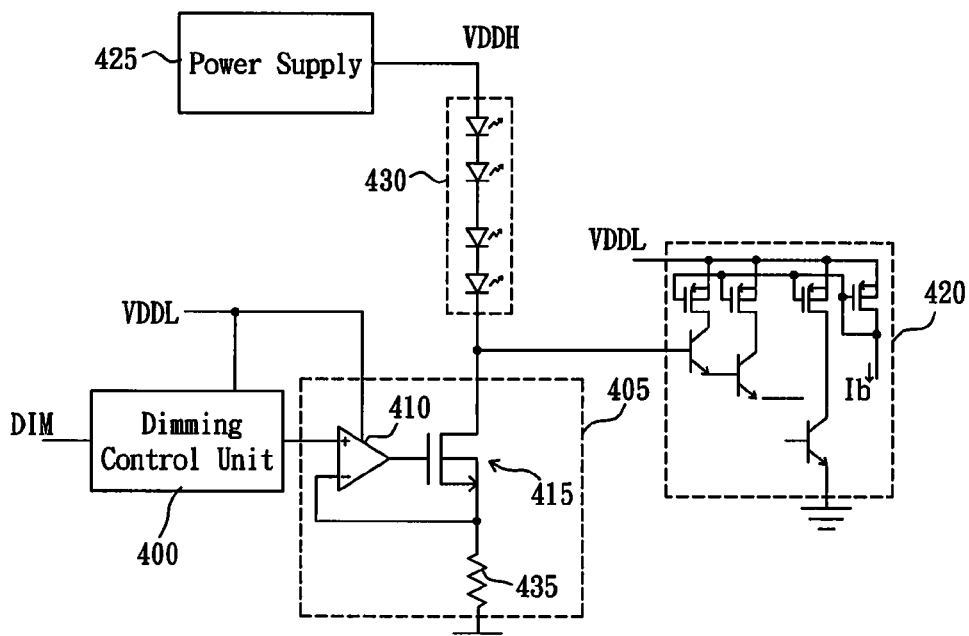
FIG. 6 is a circuit diagram for a transistor switch module of a fourth preferred embodiment according to the present invention, which is applicable in an LED driving device.

Refer next to FIG. 6, wherein a circuit diagram for a transistor switch module of a fourth preferred embodiment according to the present invention, which is applicable in an LED driving device, is shown. The LED driving device shown in the FIG. 6 comprises a dimming control unit 400, a current control device 405, a voltage clamping component 420, a power supply 425 and an LED module 430. Herein the current control device 405 comprises a current control unit 410, a MOSFET 415 and a current detection resistor 435. Compared with the embodiment shown in FIG. 2, the voltage clamping component 420 includes at least one bipolar transistor, in which the emitter of the each bipolar transistor is coupled to the base of the next bipolar transistor, the emitter of the last bipolar transistor is coupled to ground, and the collectors of these bipolar transistors are coupled to a current source (e.g. the current mirror in the present embodiment), allowing the bipolar transistors to demonstrate the feature of PN junction, so as to clamp the electric potential difference between the first end and the second end of the current control device 405 under a preset value.

From the descriptions as above, the voltage clamping component according to the present invention can be formed by any components capable of voltage clamping or a combination thereof; for example, the voltage clamping component can be at least one diode, at least one Zener diode, at least one bipolar transistor or else a combination of such said components. In addition, each controller, e.g. the dimming control unit in the embodiments, is configured with an Electrostatic Discharge (ESD) unit for clamping the electric potential of the circuit inside the controller within a range approximately from a ground level to an operation voltage, thereby protecting the controller from possibly destructive threat of instantaneous high voltage caused by static electricity. Hence, the ESD unit of the controller can be also used as the voltage clamping component in the present invention to achieve the same effect.

Figure 7:
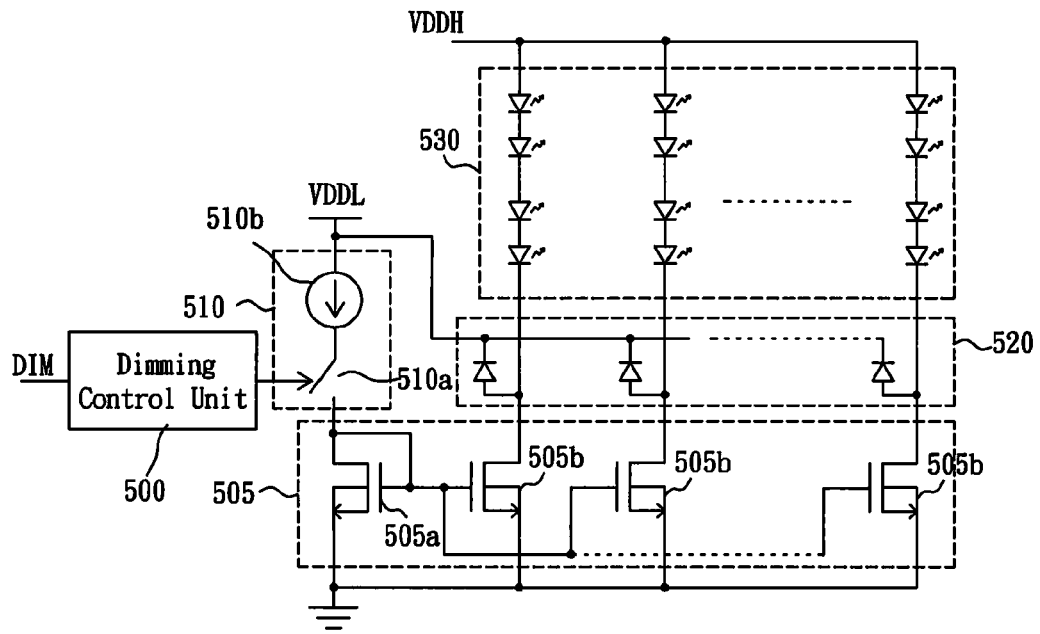
FIG. 7 is a circuit diagram for a transistor switch module of a fifth preferred embodiment according to the present invention, which is applicable in an LED driving device.

The LED modules in the aforementioned embodiments are exemplified in terms of a single LED string for descriptions; however, in practice, the present invention is also applicable for driving an LED module composed of a plurality of LED strings. Refer to FIG. 7, wherein a circuit diagram for an LED driving control unit of a fifth preferred embodiment according to the present invention is shown. The illustrated LED driving control unit comprises a current control component, comprising comprises a current mirror 505 and a current source unit 510, and a voltage clamping component 520. The current control component has a control end, a reference end and a plurality of driving ends, in which each of the plurality of driving ends is respectively coupled to one of the plurality of LED strings inside the LED module 530 so as to enable the LED module 530 lighting; and the control end receives a control signal generated by the dimming control unit 500 for controlling the current control component to be in a conductive state or a cut-off state. Meanwhile, the reference end is grounded. The dimming control unit 500 generates the control signal based on a control signal DIM.

The current source unit 510 of the current control component has a current source 510b and a transistor switch 510a, while said transistor switch 510a being cut-off or conductive based on the control signal. The current mirror 505 of the current control component has a current reference unit 505a and a plurality of current mirroring units 505b, wherein the current reference unit 505a is coupled to the transistor switch 510a, and each of the plurality of current mirroring units 505b is respectively coupled to one of the plurality of driving ends. When the transistor switch 510a conducts the current to the current reference unit 505a of the current mirror 505, the current control unit is in a conductive state and the plurality of current mirroring units 505b mirrors the current flowing therein, such that essentially equivalent driving current flows through each LED strings inside the LED module 530, thereby enabling the LED module 530 lighting. On the other hand, when the transistor switch 510a cuts off to stop conduct the current, the current control unit is in a cut-off state and the current of the current reference unit 505a is zero, thus also causing the current of the plurality of current mirroring units 505b to become zero, and at this moment, no lighting in the LED module 530.

The current mirror 505 is formed by a plurality of N-type MOSFETs, with gate of each of the N-type MOSFETs being mutually connected, wherein the drain and gate of the N-type MOSFET of the current reference unit 505a are connected and coupled to the transistor switch 510a. Upon cut-off of the transistor switch 510a, thus bringing the current control component into a cut-off state, the electric potential of the plurality of driving ends start to increase. The voltage clamping component 520 is coupled to a plurality of driving ends of the current control component, thereby clamping the electric potential at the plurality of driving ends to a preset value, such that the electric potential at the drains of the N-type MOSFETs of the current mirror 505 does not become excessively high. At this moment, the electric potential difference between the plurality of driving ends and the reference ends of the current control component is also clamped within a preset value. In other word, no matter in a conductive state or cut-off state, the electric potential difference between drain and source of each N-type MOSFET is clamped within a preset value, which advantageously reduces the requirement on the withstand voltage of N-type MOSFET.

The preset level to be clamped by the voltage clamping component is set based on the lighting threshold voltage of the LED module 530, preferably specified approximately at (Driving Voltage VDDH-Lighting Threshold Voltage). For example, the driving voltage VDDH is 80 Volts, the LED module 530 is composed of 20 LEDs connected in series, with the average threshold voltage of LED being 3.5 Volts, so the lighting threshold voltage of the LED module 530 is 20*3.5=70 (Volts), and the preset level for clamping can be set to about 80−70=10 (Volts), preferably slightly higher than 10 Volts in order to ensure no luminance in the LED module 530. In the present embodiment, the voltage clamping component 520 is formed by multiple diodes, with the positive end of each diode being coupled to the corresponding driving end, while the negative end thereof coupled to the power source voltage VDDL (e.g., 12 Volts). Consequently, the preset level is (12+Vf) in the present embodiment, where Vf indicates forward bias voltage of the diode, generally around 0.7 Volts.

Therefore, when the dimming signal represents a conductive state, the dimming control unit 500 turns on the transistor switch 510a, and the electric potential at the plurality of driving end is lower than the preset clamp level as the current control component being in the conductive state, in which the LED module 530 illuminates and, at this moment, the voltage clamping component 520 does not function. On the other hand, when the dimming signal represents a cut-off state, the current control component is also in a cut-off state, the LED module 530 does not emit light and, at this moment, the electric potential at the plurality of driving ends is clamped by the voltage clamping component 520 to a preset level.

Certainly, just like the single diode string described in previous texts, the voltage clamping component can be replaced or substituted by any other component(s) capable of voltage clamping or a combination thereof. For example, the voltage clamping component can be at least one diode, at least one Zener diode, at least one bipolar transistor or a combination of the above-said components, with each of them being individually coupled to the corresponding one of the plurality of driving ends so as to achieve the effect of voltage clamping.

As illustrated in previous texts, the LED driving control unit according to the present invention only needs to use general low-voltage MOSFETs, rather than costly high-voltage MOSFET, thus enabling effective reduction in fabrication cost. Besides, power consumption of the low-voltage MOSFET is comparatively reduced, so the efficiency of the LED driving can be practically ameliorated.

Figure 8:
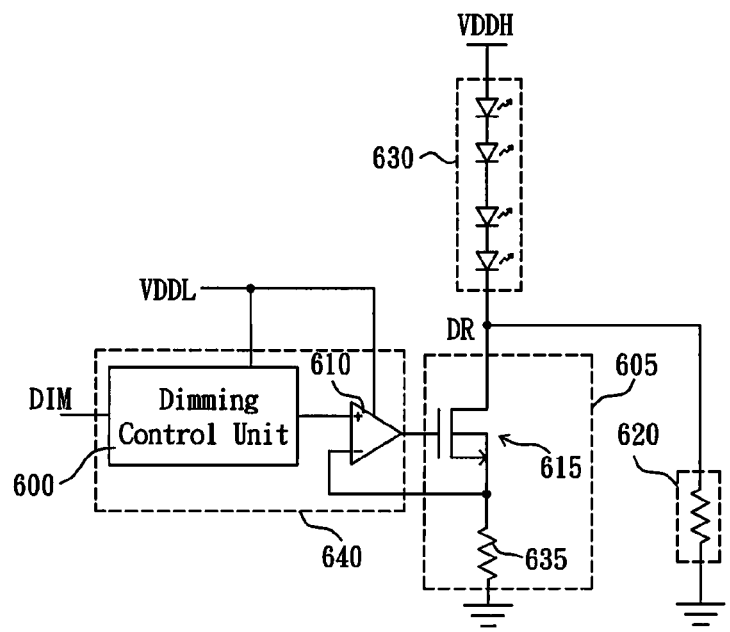
FIG. 8 is a circuit diagram for a transistor switch module of a sixth preferred embodiment according to the present invention, which is applicable in an LED driving device.

Refer now to FIG. 8, wherein a circuit diagram for an LED driving circuit of a sixth preferred embodiment according to the present invention is shown. The LED driving circuit comprises a first current control unit 605, a second current control unit 620 and an LED module 630. In the present embodiment, the first current control unit 605 comprises a transistor switch 615 and a resistor 635, wherein the transistor switch 615 is coupled to one driving end DR of the LED module 630 for providing a current to drive the LED module 630. The LED driving circuit can include a switch control unit 640 so as to generate a switch signal (not shown) to the first current unit 605 based on a control signal DIM, thereby determining whether the first current unit 605 should provide the current or not.

The switch control unit 640 comprises a dimming control unit 600 and an error amplifier 610, in which the dimming control unit 600 determines whether the transistor switch 615 should provide the current in accordance with the control signal DIM through the error amplifier 610. Herein the transistor switch 615, error amplifier 610 and resistor 635 act as a voltage-to-current converter, enabling conversion of the voltage level of the signal outputted by the dimming control unit 600 into current. The resistor 635 generates a detection signal (not shown) indicating the current flowing through the LED module and the detection signal is fed back to an inverting input end of the error amplifier 610. The non-inverting input end of the error amplifier 610 receives the output signal of the dimming control unit 600, and the inverting input end thereof receives the detection signal, and controls the transistor switch 615 accordingly.

Through the dimming control unit 600, the control signal DIM, no matter being digital signals or analog signals, can be converted into a pulse signal (not shown) to be outputted to the non-inverting input end of the error amplifier 610. For example, the control signal DIM represents 30% of dimming signal, then the duty cycle of the pulse signal outputted by the dimming control unit 600 is 30%, and when the pulse signal is high, the current flowing through the transistor switch 615 is approximately equal to a preset current value; while the pulse signal is low, the transistor switch 615 cuts off.

The second current control unit 620 is coupled to a driving end DR of the LED module 630, allowing the current flowing through the LED module 630 to be maintained at the second current value, thereby also referred as a current maintaining unit. In the present embodiment, the second current control unit 620 comprises a current maintaining resistor. Upon the transistor switch 615 conducting, current flowing through the LED module 630 is of a preset first current value, and most of it flows through the transistor switch 615. When the transistor switch 615 is in a cut-off state, the electric potential at the driving end DR starts to rise up. Due to the current maintaining resistor of the second current control unit 620, current of a second current value still passes through the LED module 630. Therefore, the cross voltage over the LED module 630 is still greater than the lighting threshold voltage, causing the voltage at the driving end DR to be clamped at a level lower than the driving voltage VDDH, thus eliminating the occurrence of excessively high potential at the driving end.

Figure 9:
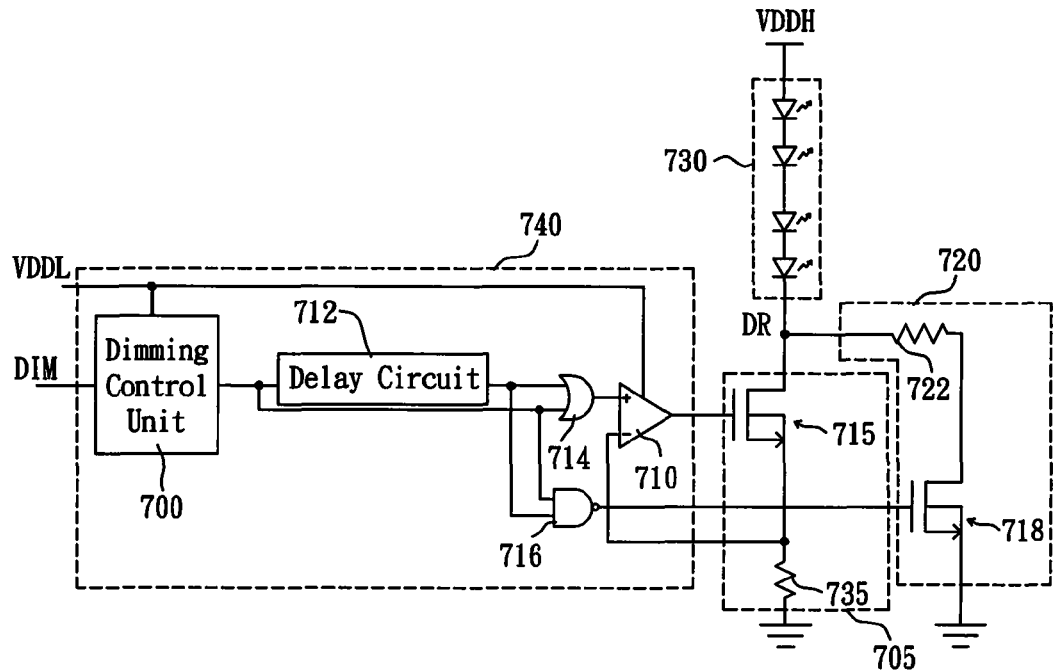
FIG. 9 is a circuit diagram for a transistor switch module of a seventh preferred embodiment according to the present invention, which is applicable in an LED driving device.

Refer next to FIG. 9, wherein a circuit diagram for an LED driving circuit of a seventh preferred embodiment according to the present invention is shown. The depicted LED driving circuit comprises a first current control unit 705, a second current control unit 720, an LED module 730 and a switch control unit 740. In the present embodiment, the first current control unit 705 comprises a transistor switch 715 and a resistor 735, in which the transistor switch 715 is coupled to a driving end DR of the LED module 730. Compared with the embodiment shown in FIG. 8, a current maintaining transistor switch 718 is additionally installed in the second current control unit 720 of the present embodiment for connecting with the current maintaining resistor 722 in series. In the embodiment shown as FIG. 8, when the pulse signal outputted by the dimming control unit 600 is at high level, small amount of current still flows through the second current control unit 620, which may cause compromised precision in dimming control. Therefore, the present embodiment adopts the current maintaining transistor switch 718 whose conductive period is almost not overlap with the conductive period of the transistor switch 715, enabling better precision in dimming control. The circuit operation for the present embodiment is described hereinafter.

The switch control unit 740 comprises a dimming control unit 700, a delay circuit 712, an OR gate 714 and an XOR gate 716. When the dimming control unit 700 receives a control signal DIM and accordingly a pulse signal of high level is outputted, the delay circuit 712 performs a delay process then outputs. The OR gates receives the signal of high level outputted by the dimming control unit 700 and the signal delayed by the delay circuit 712, and outputs a high-level signal allowing the transistor switch 715 to be conductive via the current control unit 710, an error amplifier in the present embodiment. At this moment, the first current control unit 705 provides a driving current to enable the LED module 730 lighting. The XOR gate 716 receives the signal of high level outputted by the dimming control unit 700 and the signal delayed by the delay circuit 712, and outputs a low-level signal to make the current maintaining transistor switch 718 cut off.

When the pulse signal outputted by the dimming control unit 700 turns to low level, the time that the OR gate 714 turns to output low-level signal will be postponed due to the time delay of the delay circuit 712, but the XOR gate 716 immediately turns to high-level output. At this moment, the second current control unit 720 provides a maintaining current through the current maintaining resistor 722, thereby allowing the cross voltage over the LED module 730 to be kept nearby the lighting threshold voltage. When the pulse signal outputted by the dimming control unit 700 turns once more to high level, the OR gate shifts to high level output in no time, whereas the time that the XOR gate 716 turns to output low-level signal will be postponed due to the time delay of the delay circuit 712. In this way, there exists a certain overlapping in the conductive period time between the transistor switch 715 and the current maintaining transistor switch 718, thereby preventing possible damages or breakdowns of the transistor switch 715 due to floating of the electric potential at the driving end DR.

Hence, as described in previous texts, by using the switch control unit 740 to respectively control the time sequences of conducting the transistor switch 715 of the first current control unit 705 and the current maintaining transistor switch 718 of the second current control unit 720, it is possible to individually provide the driving current and maintaining current. Since the time sequences of provision for the driving current and maintaining current rarely overlap therein between, improved precision in dimming control can be effectively achieved.

Figure 10:
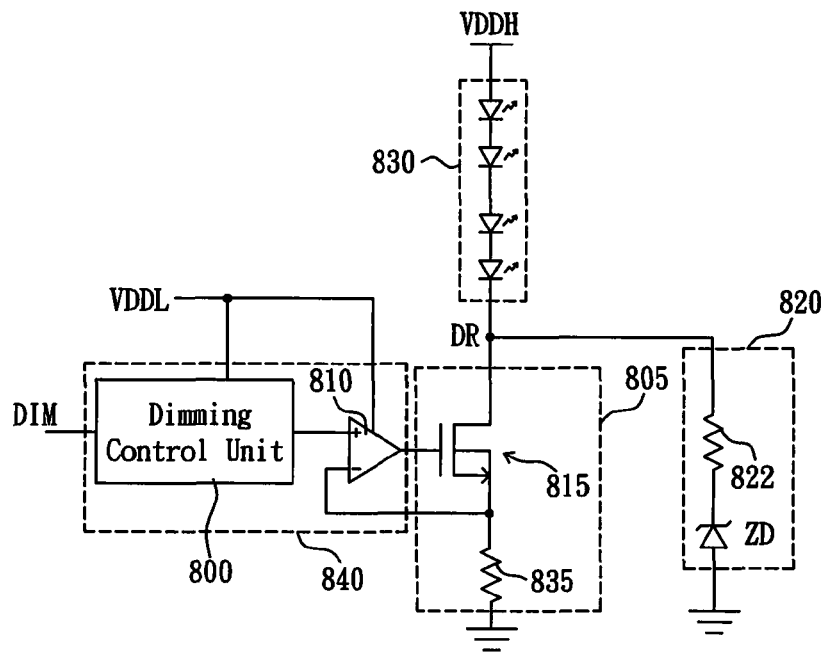
FIG. 10 is a circuit diagram for a transistor switch module of an eighth preferred embodiment according to the present invention, which is applicable in an LED driving device.

Furthermore, refer now to FIG. 10, wherein a circuit diagram for an LED driving circuit of an eighth preferred embodiment according to the present invention is shown. The illustrated LED driving circuit comprises a first current control unit 805, a second current control unit 820 and an LED module 830. In the present embodiment, the first current control unit 805 comprises a transistor switch 815 and a resistor 835, in which the transistor switch 815 is coupled to a driving end DR of the LED module 830 in order to provide a current for driving the LED module 830. The LED driving circuit may include a switch control unit 840, and the switch control unit 840 can have a dimming control unit 800 and an error amplifier 810. The dimming control unit 800 generates a switch signal (not shown) to the first current control unit 805 based on a control signal DIM, thereby allowing to determine whether the first current control unit 805 should provide the current.

The second current control unit 820 comprises a Zener diode ZD and a current maintaining resistor 822 connected in series. Compared with the embodiment shown as FIG. 8, in the present embodiment, the Zener diode ZD is used to achieve the function of the current maintaining transistor switch 718 in the embodiment as FIG. 9 for enabling simplification in circuit design. When the transistor switch 815 cuts off, the electric potential at the driving end DR starts to increase, and as it exceeds the reverse breakdown voltage of the Zener diode ZD, the current of the LED module 830 flows through the second current control unit 820. Therefore, by means of the second current control unit 820 formed by the Zener diode ZD and the current maintaining resistor 822, when the first current control unit 805 is in a cut-off state, the maintaining current is supplied to the LED module 830. On the other hand, when the first current control unit 805 conducts, provision of the maintaining current to the LED module 830 is stopped. Except Zener diode ZD, it is also possible to utilize one or more diodes for implementation; when the voltage at the driving end DR rises up and diode is forward conducted, the function of current maintenance can be achieved.

Figure 11:
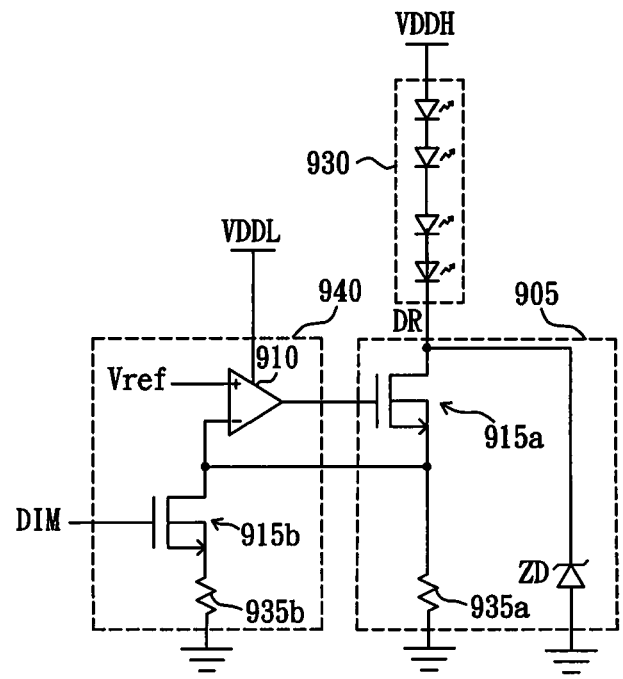
FIG. 11 is a circuit diagram for a transistor switch module of a ninth preferred embodiment according to the present invention, which is applicable in an LED driving device.

Besides, in addition to using two current control units for providing respective dimming ON and OFF currents, it is also possible to use one single current control unit to provide driving current and maintaining current in a time-division fashion based on a control signal. Refer to FIG. 11, wherein a circuit diagram for an LED driving circuit of a ninth preferred embodiment according to the present invention is shown. The present LED driving circuit comprises a current control unit 905, an LED module 930 and a switch control unit 940. The current control unit 905 comprises a first transistor switch 915a, a first detection unit 935a and a Zener diode ZD. The switch control unit 940 includes an error amplifier 910, a second transistor switch 915b and a second detection unit 935b. Herein the resistance of the second detection unit 935b is smaller than the one of the first detection unit 935a. The error amplifier 910 receives a reference voltage Vref at the non-inverting input end, and receives a detection signal (not shown) indicating the current of the LED module 930 at the inverting input end, thereby achieving feedback compensation to control the state in the first transistor switch 915a.

The second transistor switch 915b can control whether the first detection unit 935a and the second detection unit 935b are electrically connected based on the control signal DIM. When the control signal DIM is high level, the first detection unit 935a and the second detection unit 935b are connected in parallel, resulting in less equivalent resistance. At this moment, the first transistor switch 915a is conductive and greater amount of driving current is passed there through. When the control signal DIM is low level, the detection signal is generated by only the first detection unit 935a having higher resistance and fed back to the error amplifier 910. At this moment, the first transistor switch 915a is still conducted, with only trivial amount of maintaining current passing there through. Furthermore, coupling the Zener diode ZD to the driving end DR can guarantee that the electric potential at the driving end DR will not become overly high, so as to protect the transistor switch 915a from damages. The Zener diode ZD in the present embodiment may have a higher reverse breakdown voltage and is conducted when the cross voltage over the LED module 930 is lower than the lighting threshold voltage, hereby preventing any current from flowing through the Zener diode ZD which may cause poor precision in dimming operation.

In continuation, the embodiments illustrated as FIGS. 12 and 13 will be described by means of LED modules of multiple LED strings.

Figure 12:
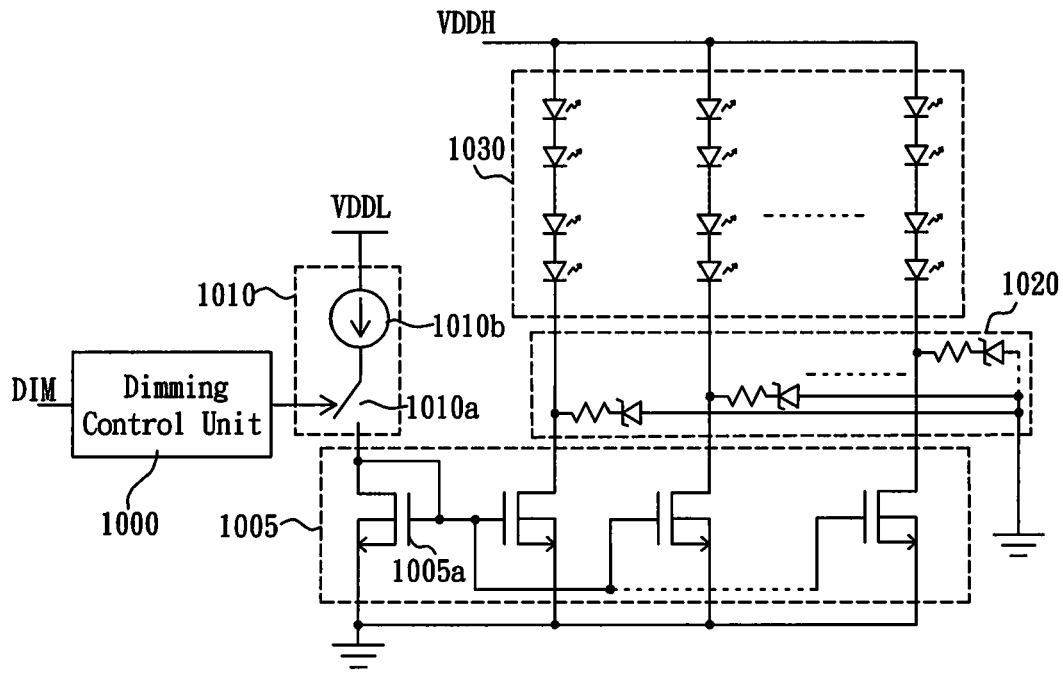
FIG. 12 is a circuit diagram for a transistor switch module of a tenth preferred embodiment according to the present invention, which is applicable in an LED driving device.
Figure 13:
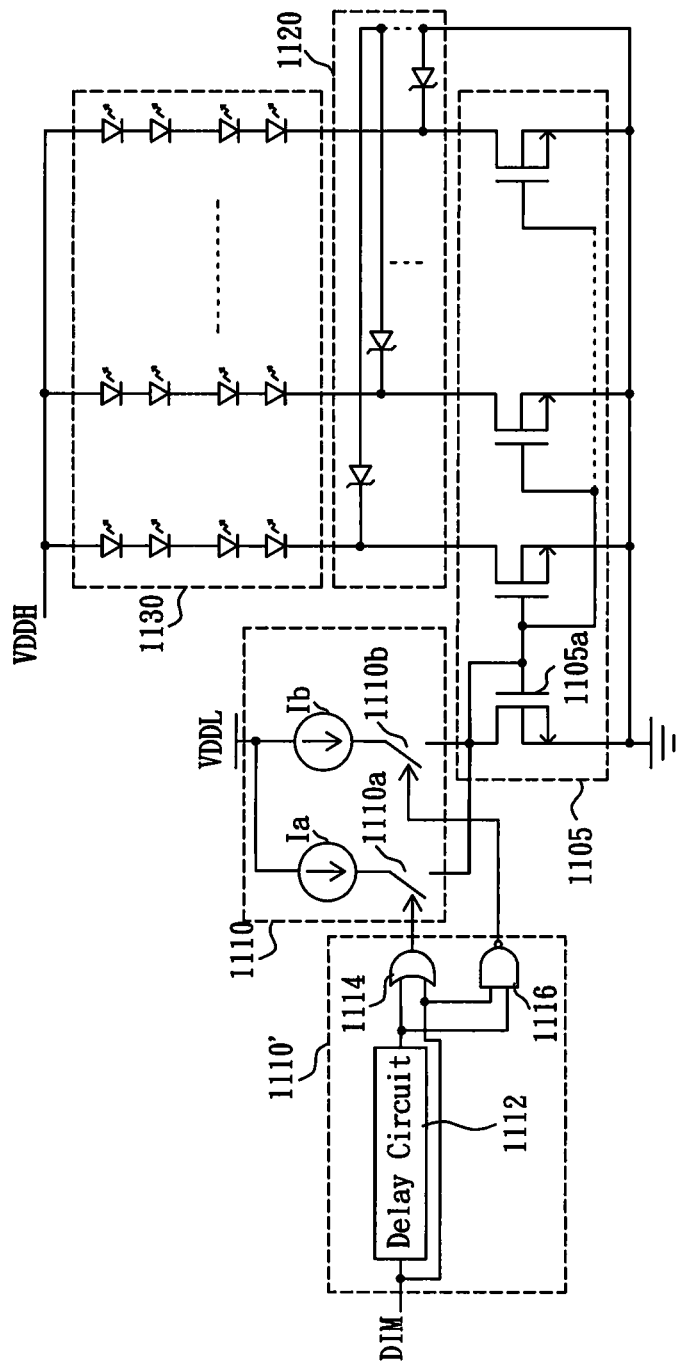
FIG. 13 is a circuit diagram for a transistor switch module of an eleventh preferred embodiment according to the present invention, which is applicable in an LED driving device.

Refer to FIG. 12, wherein a circuit diagram for an LED driving circuit of a tenth preferred embodiment according to the present invention is shown. The depicted LED driving circuit comprises a first current control unit 1005, a second current control unit 1020, and an LED module 1030. In the present embodiment, the first current control unit 1005 is a current mirror, comprising a plurality of transistor switches whose sources and gates are mutually connected, and the drain and gate of a reference transistor 1005a are connected. The second current control unit 1020 includes a plurality set of current maintaining resistor and Zener diode connected in series, respectively coupled to corresponding driving end. Since the second current control unit 1020 is coupled to each driving end, when the current source unit 1010 cuts off and stops outputting the reference current, the second current control unit 1020 conducts and provides a maintaining current to prevent the electric potential at each driving end from becoming overly high.

The current source unit 1010 provides a reference current to the reference transistor 1005a so as to mirror the reference current to other transistor switches in the first current control unit 1005, allowing essentially equivalent amount of current to flow through each LED string of the LED module 1030; that is, the driving current flowing through the LED module 1030 will be averaged to each driving end (i.e., the drain of the transistor switch of the first current control unit 1005) in a fashion of generally even distribution.

A dimming control unit 1000 controls the transistor switch 1010a in the current source unit 1010 based on the control signal DIM, which cuts off the transistor switch 1010a when the control signal DIM represents an OFF state and conducts the transistor switch 1010a when the control signal DIM represents an ON state. When the current source unit 1010 cuts off and stops outputting the reference current, the first current control unit 1005 stops providing the driving current. At this moment, the voltage at the driving end starts to increase, enabling the second current control unit 1020 conducting to provide a maintaining current.

Subsequently, refer to FIG. 13, wherein a circuit diagram for an LED driving circuit of an eleventh preferred embodiment according to the present invention is shown. In the present embodiment, driving current and maintaining current is respectively provided by using a single current control unit in accordance with the control signal DIM. The LED driving circuit herein shown comprises a first current control unit 1105, a power source unit 1110, a current switch unit 1110', a protection unit 1120 and an LED module 1130. The current source unit 1110 comprises a first current source Ia and a first current source switch 1110a, a second current source Ib and a second current source switch 1110b. A current switch unit 1110' comprises a delay circuit 1112, an OR gate 1114 and an XOR gate 1116. The control signal DIM is directly inputted into the delay circuit 1112, and when the control signal DIM is a high level signal representing "ON", the current switch unit 1110' turns on the first current source switch 1110a so as to provide current of the first current source Ia, and also turns off the second current source switch 1110b so as to stop providing current of the second current source Ib. At this moment, the current control unit 1105 mirrors the current of the first current source Ia to each driving end, allowing a driving current to flow through the LED module 1130.

However, when the control signal DIM is a low level signal representing "OFF", the current switch unit 1110' turns on the second current source switch 1110b so as to enable providing current of the second current source Ib, and turns off the first current source switch 1110a so as to stop providing current of the second current source Ia. At this moment, the current control unit 1105 mirrors the current of the second current source Ib to each driving end, allowing a maintaining current to flow through the LED module 1130. Besides, to make sure that electric potential at each driving end will not become overly high, it is possible to electrically couple a protection unit 1120 formed by Zener diodes to each driving end in order to protect the current control unit 1105.

According to the descriptions illustrated in previous texts, the LED driving circuit according to the present invention still allows a small amount of maintaining current to flow through the LED module as the control signal representing "OFF", in this way, the cross voltage over the LED module can be sustained nearby the lighting threshold voltage, preventing the voltage difference between the drain and the source of the transistor in the LED driving circuit from becoming excessively large. Consequently, the LED driving circuit and LED driving control unit thereof according to the present invention can effectively decrease the requirement on the withstand voltage of transistor, and accordingly, the fabrication cost of LED driving circuits can be significantly saved and power consumption of MOSFETs can be lessened as well, thereby improving integral efficiency in the circuit.

In summary, the present invention herein illustrated demonstrates novelty, advancement and industrial usability which meet legal requirements on patent application. The present invention has been disclosed by means of the preferred embodiments thereof, but those skilled ones in the art can appreciate that such embodiments are simply exemplary and should not be construed as limiting the scope of the present invention. It is to be noticed that all effectively equivalent changes, modifications or substitutions made to such embodiments should be deemed as being covered by the scope of the present invention. Therefore, the scope of the present invention requested to be legally protected should be delineated by the claims set forth hereunder.

What is claimed is:

1. A light-emitting diode (LED) driving circuit, comprising:
   an LED module, having at least one connecting end; and
   a current control component, having a control end and at least one driving end, in which the at least one driving end is correspondingly coupled to the at least one connecting end of the LED module and the control end receives a control signal so as to control a current flowing through the LED module to be of a first current value or a second current value, wherein the first current value is greater than the second current value, and the current control component determines whether the current flowing through the LED module to be the first current value when the control signal is in a first state and to be the second current value when the control signal is in a second state, the current control component comprises:
   a first current control unit, coupled to the at least one driving end and providing substantially equal current to each of the driving end, wherein the first current control unit determines whether providing the current based on the control signal; and
   a second current control unit, coupled to the at least one driving end and allowing the current flowing through the LED module to be equal to the second current value.

2. The LED driving circuit according to claim 1, wherein a ratio of the first current value against the second current value is greater than a preset ratio.

3. The LED driving circuit according to claim 1, wherein the second current control unit comprises at least one current maintaining resistor.

4. The LED driving circuit according to claim 1, further comprising a switch control unit coupled to the first current control unit and the second current control unit, in which the switch control unit respectively controls the first current control unit and the second current control unit to provide the current based on the control signal.

5. A light-emitting diode (LED) driving control unit, comprising:
   a current switch unit, generating at least one switch signal based on a control signal; and
   a current control unit, having at least one driving end and a control end, in which the at least one driving end is correspondingly coupled to at least one connecting end of an LED module, the control end receives the at least one switch signal to control a current flowing through the LED module to be a first current value when the control signal is in a first state and a second current value when the control signal is in a second state, wherein the current control unit comprises a first current source and a second current source, thereby providing the current of the first current value and the current of the second current value.

6. A transistor switch module, comprising:
   a transistor switch, having a control end, a first end and a second end, in which the first end is coupled to an LED module, and the control end receives a control signal for controlling a magnitude of a current flowing through the transistor switch;
   a controller, generating the control signal for controlling a state in the transistor switch, wherein the controller comprises an error amplifier, which generates the control signal based on a voltage level at the second end and a reference voltage; and
   a voltage clamping component, coupled to the first end of the transistor switch, such that, as the magnitude of the current being zero, the voltage clamping component clamps an electric potential at the first end of the transistor switch to be lower than or equal to a preset electric potential.

7. A light-emitting diode (LED) driving circuit, comprising:
an LED module, comprising a plurality of LEDs connected in series, and having one end being connected to a direct current driving voltage;
a current control device, having a control end, a first and a second end, in which the first end is coupled to the other end of the LED module, the second end is grounded, and the control end receives a control signal for controlling a current flowing through the LED module;
a voltage clamping component, coupled to the first end of the current control device for clamping an electric potential at the first end; and
a dimming control unit, generating the control signal based on a dimming signal;
wherein the voltage clamping component clamps the electric potential at the first end to be lower than or equal to a preset electric potential when the dimming signal represents a cut-off state, and the current control device further comprises a current control unit, which outputs a gate control signal based on a detection signal indicating the current and the control signal so as to control a metal Oxide Semi Field Effect Transistor (MOSFET).

8. The LED driving circuit according to claim 7, wherein the current control device comprises a Metal Oxide Semiconductor Field Effect Transistor (MOSFET), with a first source/drain of the MOSFET coupled to the first end and a second source/drain of the MOSFET coupled to the second end.

9. A light-emitting diode (LED) driving control unit, comprising:
a current control component, comprising a control end, a reference end and at least one driving end, in which the at least one driving end is correspondingly coupled to at least one connecting end of an LED module, the control end receives a control signal for controlling the current control component to be in a conductive state or a cut-off state, and the reference end is coupled to a reference level; and
a voltage clamping component, coupled to the at least one driving end of the current control component, so as to clamp a difference of electric potentials between the reference end and the at least one driving end to be lower than or equal to a preset value;
wherein, the preset value is dependent on a lighting threshold voltage of the LED module.

10. The LED driving control unit according to claim 9, wherein the current control component comprises a current mirror, which has a current reference unit and at least one current mirroring unit, the current reference unit generates a reference current according to the control signal when being in the conductive state, wherein the at least one current mirroring unit is coupled to the current reference unit and correspondingly coupled to the at least one driving end, and generates at least one driving current at the at least one driving end in accordance with the reference current.

11. The LED driving control unit according to claim 9, wherein the voltage clamping component is an Electrostatic Discharge (ESD) unit of a controller.

12. The LED driving control unit according to claim 9, wherein the voltage clamping component includes a diode, a Zener diode, a bipolar transistor or a combination thereof.

* * * * *